Jan. 22, 1952      M. E. CHUN      2,583,469

CALIBRATION UNIT FOR CATHODE-RAY TUBES

Filed Jan. 5, 1951      2 SHEETS—SHEET 1

INVENTOR.
MELVIN E. CHUN

BY Roland A. Anderson

ATTORNEY.

Jan. 22, 1952      M. E. CHUN      2,583,469
CALIBRATION UNIT FOR CATHODE-RAY TUBES
Filed Jan. 5, 1951      2 SHEETS—SHEET 2
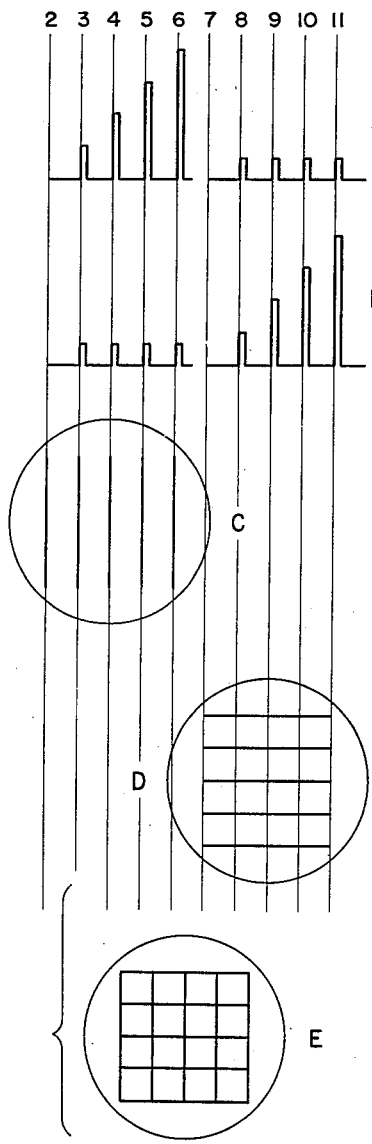
Fig.2.
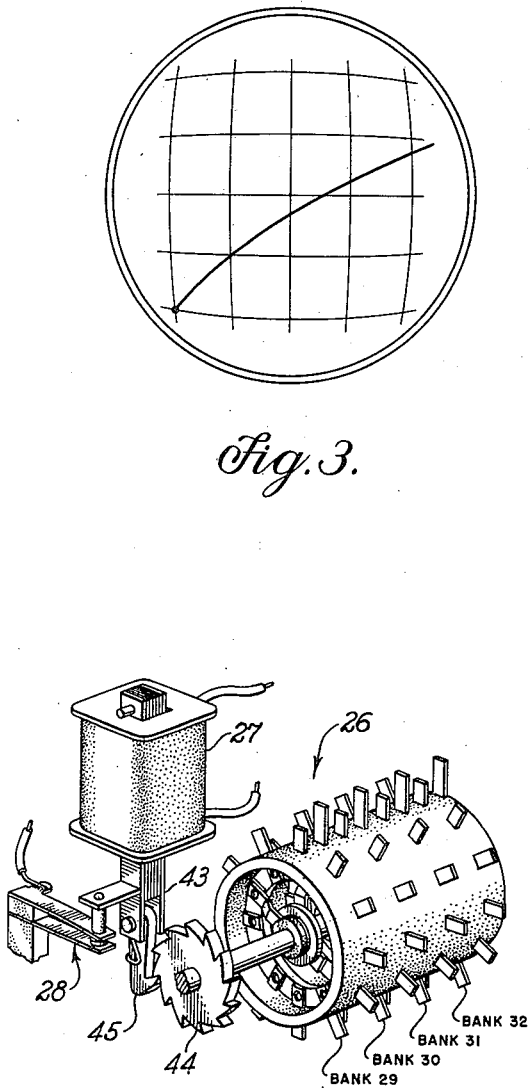
Fig.3.
Fig.4.
INVENTOR.
MELVIN E. CHUN
BY
ATTORNEY.

Patented Jan. 22, 1952

2,583,469

UNITED STATES PATENT OFFICE 2,583,469

CALIBRATION UNIT FOR CATHODE-RAY TUBES

Melvin E. Chun, Berkeley, Calif., assignor to the United States of America as represented by the United States Atomic Energy Commission Application January 5, 1951, Serial No. 204,619

4 Claims. (Cl. 315—26)

This invention relates to a calibration unit for cathode ray tubes and more particularly to a circuit for providing an accurately calibrated reference grid trace on the screen of a cathode ray tube.

In using cathode ray tubes for measurement purposes it is necessary to place a sheet of transparent material having vertical and horizontal grid lines inscribed thereon over the screen face of the tube. Such a procedure then involves calibration of the grid in terms of known voltages applied to the deflecting plates of the cathode ray tube. Because of inherent characteristics of the necessary electronic circuits variations in the calibration of the tube occur thereby necessitating further calibration.

The present invention provides a circuit for producing an accurately calibrated grid on the cathode ray tube screen with the electron beam thereof. With such a device it will be readily apparent that distortion of the calibration lines will be the same as for the measuring trace so that a high degree of accuracy results.

It is therefore an object of the invention to provide a new and improved method of calibration for a cathode ray tube.

Another object of the present invention is to provide a circuit for inscribing horizontal and vertical grid lines on a cathode ray tube screen with the electron beam thereof.

Still another object of the present invention is to provide a calibration unit for cathode ray tubes wherein an accurately calibrated system of grid lines is traced on the viewing screen prior to applying signal voltages to the deflecting plates.

A further object of the invention is to provide a simple electrical circuit, using standard parts, for calibrating cathode ray tubes.

Other objects and advantages of the invention will be apparent when considered together with the accompanying drawing in which:

Fig. 2 is a series of time-correlated voltage waveforms at each step of the relay together with resultant traces on the screen of a cathode ray tube to which such voltages are applied;

Fig. 3 is an illustration of the trace of a cathode ray tube utilizing the present invention and portraying characteristics of a device; and Fig. 4 is an isometric illustration of a stepping relay as utilized in the present invention.

Figure 1:
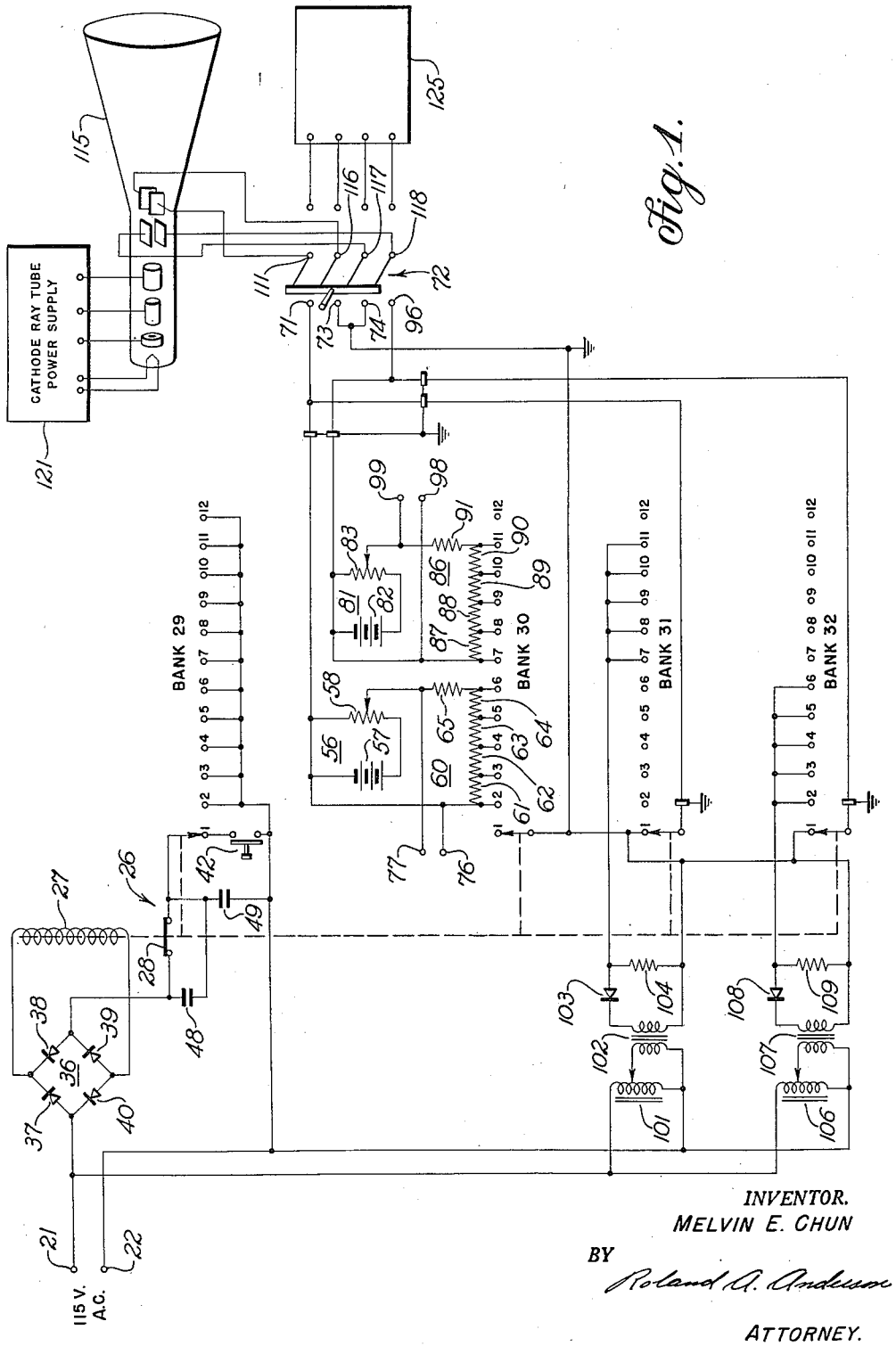
Figure 1 is a schematic wiring diagram of the present invention.

Referring to the drawing in detail, and Fig. 1 in particular, a pair of terminals 21 and 22 are provided which may readily be connected to a source (not shown) of commercial alternating current. For control purposes there is provided a conventional stepping relay 26 having an actuating coil 27, a principal contactor 28, and four banks 29, 30, 31, and 32 of twelve secondary contacts. A full wave rectifier 36, having four unidirectional units 37, 38, 39, and 40 connected in a conventional manner, is utilized to provide energizing current to the coil 27 by connecting the terminal 21 to the junction between the units 37 and 40, with one end of the coil 27 connected to the junction between the units 37 and 38 and the other end of the coil connected to the junction between the units 39 and 40. One side of the principal contactor 28 is connected to the junction between the units 38 and 39 while the other side thereof is connected to the movable element of the first bank of contacts which in the normal position, is touching the first of the twelve contacts. For starting purposes a conventional normally open push button 42 is connected between the terminal 22 and the first contact of the bank 29.

The relay 26 is constructed so that the principal contactor 28 is closed when no current flows through the coil 27. Each time the coil 27 is energized the contactor 28 is opened and, through a mechanical linkage attached to the plunger 43 disposed through the coil 27 and including a ratchet wheel 44 and pawl 45, the movable element of each bank of twelve contacts is moved to the next successive contact. While the drawing shows the banks 29, 30, 31, and 32 of contacts in line, the actual disposition of the contacts is about the circumference of a circle with the movable elements of each bank extending radially from the rotatable center post coupled to the aforesaid ratchet wheel and pawl. From the foregoing it will be readily apparent that the movable elements of the banks 29, 30, 31, and 32 will move successively from contact to contact as long as the coil 27 is intermittently energized.

Now consider the operation of the relay 26 with the electrical connections, as discussed previously, accomplished. It will be seen that no current will flow in the rectifier 36 until the circuit through the push button 42 is completed to the terminal 22. Thus by closing the push button 42 the coil 27 is energized to open the principal contactor 28 and simultaneously to move the movable element of the bank 29 from the first contact to the second. In order to provide continuous movement of the movable element consecutively to each contact and finally back to the first contact, each of the second to twelfth contacts of the bank 29 is connected directly to the terminal 22. Under this last circumstance it will be readily apparent that a momentary closure of the push button 42 will start the sequential operation of the relay 26 whereby the coil 27 is energized to open the contactor 28 momentarily and to move the movable elements to the next contact of the banks. The opening of the contactor 28 results in denergization of the coil 27 which then closes the contactor 28 to again energize the coil 27. This latter process continues until the movable element of the bank 29 reaches the first contact where the circuit between the rectifier 36 and the terminal 22 is broken by the normally open push button 42. To minimize sparking across the contactor 28 and between the movable element and contacts of the bank 29, a capacitor 48 is connected across the former and a capacitor 49 is connected across the latter and the push button 42.

A first source 56 of unidirectional voltage is provided and, as illustrated in Fig. 1, may comprise a series of batteries 57 with a potentiometer 58 connected thereacross. A voltage divider 60 comprising five series-connected resistors 61, 62, 63, 64, and 65 of equal value is connected between the negative side of the batteries 57 and the adjustable arm of the potentiometer 58. The negative side of the batteries 57 is also connected to the second contact of the bank 30 and the junctions between the resistors of the voltage divider 60 are respectively connected to the third, fourth, fifth, and sixth contacts. A further connection of the negative side of the batteries 57 is made to a terminal 71 on one side of a four pole double throw switch 72 while the movable element of the bank 30 is connected to two grounded terminals 73 and 74 on the same side of the switch 72. To provide a means of determining the voltage between the negative side of the batteries 57 and the adjustable arm of the potentiometer 58 a connection from each is made to a pair of terminals 76 and 77, respectively, across which may be connected a voltmeter (not shown). It will thus be seen that with the movable element of bank 30 at the second contact no voltage will appear across the terminals 71 and 73, but that, as the movable element progresses to the sixth contact the voltage at the switch 72 will increase at each step by an increment amounting to 20 per cent of the voltage appearing across the terminals 76 and 77.

A second source 81 of unidirectional voltage is provided and may comprise a series of batteries 82 with a potentiometer 83 connected thereacross. A voltage divider 86 comprising five series connected resistors 87, 88, 89, 90, and 91 of equal value is connected between the negative side of the batteries 82 and the adjustable arm of the potentiometer 83. The negative side of the batteries 82 is also connected to the seventh contact of the bank 30 and the junctions between the resistors of the voltage divider 86 are respectively connected to the eighth, ninth, tenth, and eleventh contacts. A further connection of the negative side of the batteries 82 is made to the remaining terminal 96 of the switch 72 on the same side as the above-mentioned connections thereto. To provide means of determining the voltage between the negative side of the batteries 82 and the adjustable arm of the potentiometer 83 a connection from each is made to a pair of terminals 98 and 99, respectively, across which may be connected a voltmeter (not shown). From the foregoing it is seen that as the movable element of the bank 30 moves from the sixth to the seventh contact no voltage appears across the terminals 96 and 74 of the switch 72, but that, as the movable element moves successively from the seventh to the eleventh contact a voltage appears across such terminals which increases in increments amounting to twenty per cent of the voltage across the terminals 98 and 99.

Connected between the terminals 21 and 22 is a device 101 for supplying an adjustable alternating current. The primary winding of a transformer 102 is connected between the adjustable element of the device 101 and one side thereof. A half wave rectifier 103 and a series connected resistor 104 is connected across the secondary winding of the transformer 102 whereby a pulsating direct current is developed across the resistor 104. One side of the resistor 104 is connected to each of the seventh to eleventh contact of the bank 31 while the other side of the resistor 104 is connected to the first contact which is, in turn, connected to the movable element of the bank 30. The movable element of the bank 31 is connected to the terminal 71 of the switch 72. Thus it will be apparent that the voltage across the resistor 104 will appear between the terminals 71 and 73 of the switch 72 each time the movable element of the bank 31 is located at one of the seventh to eleventh contact of the bank 31.

A device 106 for supplying an adjustable alternating current is connected between the terminals 21 and 22. The primary winding of a transformer 107 is connected between the adjustable element of the device 106 and one side thereof. A half wave rectifier 108 and a series connected resistor 109 is connected across the secondary winding of the transformer 107 whereby a pulsating direct current is developed across the resistor 109. One side of the resistor 109 is connected to each of the second to sixth contact of the bank 32 while the other side of the resistor is connected to the first contact which is, in turn, connected to the first contact of the bank 31. The movable element of the bank 32 is connected to the terminal 96 of the switch 72. Thus it will be apparent that the voltage across the resistor 109 will appear between the terminals 74 and 96 of the switch 72 each time the movable element of the bank 32 is located at one of the second to sixth contact of the bank 32.

A central terminal 111, which is in line with the terminal 71 of the switch 72, is connected to one of the horizontal deflecting plates of a conventional cathode ray tube 115. A second central terminal 116, which is in line with the terminal 73 of the switch 72, is connected to the second horizontal deflecting plate of the tube 115. A third central terminal 117, which is in line with the terminal 74 of the switch 72, is connected to one of the vertical deflecting plates of the tube 115. To complete the connections between the switch 72 and the tube 115 a connection is made from the remaining central terminal 118 of the former to the other vertical deflecting plate of the latter.

To supply suitable operating potentials to the cathode ray tube 115, there is provided a conventional power supply 121. The various elements of the tube 115 are connected to terminals of the power supply 121 which bear the proper potential relationship with respect to one another.

From the foregoing it will be apparent that with one throw of the switch, so that the terminals 71, 73, 74, and 96 are connected to the deflecting plates of the cathode ray tube 115, the sequentially impressed voltages at such terminals are applied to the deflecting plates of the tube.

Consider now the operation of the above-described circuit with the terminals 21 and 22 suitably energized by a source of alternating current and the power supply 121 turned on. Under such circumstances the closing of the push button 42 starts the sequence of operation by completing the circuit through the full wave rectifier 36 to energize the coil 27 of the relay 26. As has been described previously the movable elements of the banks 29 to 32 of contacts travel simultaneously and successively from contact 1 to 12 and back to contact 1. During the time the movable elements rest on contact 1 of the banks 29 to 32 there is no voltage appearing across any of the terminals of the switch 72. When the movable elements touch contact 2 of the banks 29 to 32 it will be seen that no voltage is impressed across the terminals 71 and 73 of the switch 72 but that a voltage equal to that across the resistor 109 is impressed across the terminals 74 and 96 of the switch 72. With the movable elements of the banks 29 to 32 at contact 3 of each bank, a voltage equal to that across the resistor 61 appears across the terminals 71 and 73 and a voltage equal to that across the resistor 109 again appears across terminals 74 and 96. Thus, each time the movable elements travel to successive contacts of the banks 29 to 32 the voltage appearing across the terminals 71 and 73 increases by a twenty per cent increment of the total voltage across the terminals 76 and 77 and an equal voltage appears across the terminals 74 and 96 at each contact. The foregoing occurs until the movable elements reach contact 7 of the banks 29 to 32, at which time the voltage across the terminals 74 and 96 of the switch 72 is zero while the voltage across the terminals 71 and 73 is equal to the voltage of the resistor 104. As the movable elements move across the remaining contacts of the banks 29 to 32 a voltage equal to the resistor 104 appears across the terminals 71 and 73 at each contact and a voltage which increases from zero, in twenty per cent increments, to the value of the voltage across the terminals 98 and 99 appears across the terminals 74 and 96. The foregoing voltages have been illustrated in Figs. 2A and 2B which illustrate the time correlation between the voltages across terminals 71 and 73 and those across terminals 74 and 96, respectively, during one cycle of operation of the relay 26.

Now, with the switch 72 thrown into position to connect the terminals 71, 73, 74, and 96 to the deflecting plates of the cathode ray tube 115, it will be seen that the voltages applied to the horizontal deflecting plates corresponding to the second to sixth contacts provide successive horizontal deflections of the cathode ray tube electron beam. At the same time voltages are impressed on the vertical deflecting plates of the tube 115 which deflect the beam in a vertical direction. The result of these voltages is to trace five vertical lines with the electron beam on the screen of the tube 115, as illustrated in Fig. 2C. A similar combination of deflecting voltages, as shown in Figs. 2A and 2B, during the time the movable element of the relay 26 traverses the seventh to eleventh contacts of the banks 29 to 32 results in five horizontal trace lines on the screen of the tube 115, as shown in Fig. 2D. The resultant trace on the screen of the tube 115 is an accurately defined system of grid lines, as shown in Fig. 2E.

After a system of grid lines has been traced on the screen of the cathode ray tube 115, as explained above, the switch 72 may be thrown into the opposite position to connect a device 125, the characteristics of which it is desired to measure, to the deflecting plates of the tube. Such a device 125 may be any electrical apparatus, for example, a magnetic winding of which it is desired to determined the current-voltage characteristic. In the latter instance a voltage proportional to the current through the device 125 may be connected to two of the terminals of the switch 72 leading to the horizontal deflecting plates of the tube 115 while the voltage of the device 125 is connected to the other two terminals of the switch 72 leading to the vertical deflecting plates. With such connections made when the switch 72 is thrown in the last mentioned position, a trace is formed across the screen of the tube 115, as shown in Fig. 3, showing the relation between the current and voltage which may be readily and accurately measured by using the calibrated system of grid lines.

The foregoing system may readily be used where the cathode ray tube has a persistent screen. However, if such a cathode ray tube is not available, a camera or other photographic means may be positioned adjacent the cathode ray tube screen to record the system of grid lines and then later the characteristic desired to be measured.

With the above-outlined apparatus and procedure it will be readily apparent that the time characteristic may be measured as well as the current-voltage characteristic. That is, it is possible to introduce time into the measurements by grid modulation of the cathode ray tube 115 and this may be done with a conventional circuit interrupter inserted between the power supply 121 and the grid of the tube 115. It will also be apparent that a grid system having more than the five vertical and five horizontal lines, as described in the foregoing, may easily be obtained by utilizing a relay having a sufficient number of contacts connected in the manner shown.

While the salient features of the present invention have been described in detail with respect to one embodiment it will, of course, be apparent that numerous modifications may be made within the spirit and scope of this invention and it is therefore not desired to limit the invention to the exact details except insofar as they may be defined in the following claims.

What is claimed is:

1. In a calibrating device for a cathode ray tube having an electron gun, a pair of horizontal deflecting plates, a pair of vertical deflecting plates, and a viewing screen, the combination comprising means connected to said electron gun for projecting an electron stream therefrom, means connected to said horizontal deflecting plates for impressing a series of successively increasing pulses of voltage, means connected to said vertical plates for impressing a series of equal pulses of voltage having a repetition rate equal to that of said series of increasing pulses of voltage, and means connected to the aforementioned means for interchanging said latter two connections.

2. In a calibrating device for a cathode ray tube having an electron gun, a pair of horizontal deflecting plates, a pair of vertical deflecting plates, and a viewing screen, the combination comprising means connected to said electron gun for projecting an electron stream therefrom, a first and second source of unidirectional voltage each having a plurality of taps for supplying increasing incremental portions of said voltage, a third and fourth source of unidirectional voltage each having a constant value, automatic relay means interconnected between said sources and said deflecting plates for applying said incremental voltages of said first source to said horizontal plates and said constant voltage of said third source to said vertical plates in synchronism with said incremental voltages, and then applying said incremental voltages of said second source to said vertical plates and said constant voltage of said fourth source to said horizontal plates in synchronism with said incremental voltages.

3. In a calibrating device for a cathode ray tube having an electron gun, a pair of horizontal deflecting plates, a pair of vertical deflecting plates, and a viewing screen, the combination comprising means connected to said electron gun for projecting an electron stream therefrom, a first source of unidirectional voltage including a voltage divider having a plurality of voltage points, means connected between the voltage divider of said first source and said horizontal plates for successively applying the voltage of each voltage point thereto, a second source of unidirectional voltage, means connected between said second source and said vertical plates for applying a constant voltage thereto each time voltage from said first source is applied to said horizontal plates, a third source of unidirectional voltage including a voltage divider having a plurality of voltage points, means connected between the voltage divider of said third source and said vertical plates for successively applying the voltage of each voltage point thereto, a fourth source of unidirectional voltage, mean connected between said fourth source and said horizontal plates for applying a constant voltage thereto each time that voltage from said third source is applied to said vertical plates.

4. In a calibrating device for a cathode ray tube having an electron gun, a pair of horizontal deflecting plates, a pair of vertical deflecting plates, and a persistent viewing screen, means connected to said electron gun for projecting an electron stream therefrom, a plurality of contacts arranged in at least three banks, each of said banks of contacts disposed in a circular array about a central rotatable shaft having a projecting contacting element for each bank, a first voltage divider having a plurality of taps connected to a similar number of consecutive contacts of the first bank, a second voltage divider having a plurality of taps connected to a similar number of contacts of said first bank, means connected across each of said voltage dividers for impressing a predetermined unidirectional voltage, one side of said first voltage divider being connected to one of said horizontal deflecting plates and the contacting element of said first bank being connected to a common connection between the other horizontal deflecting plate and one of said vertical deflecting plates, one side of said second voltage divider being connected to the other vertical deflecting plate, a first source of unidirectional voltage having one side connected to a plurality of contacts of the second bank corresponding to the contacts of said first bank which are connected to said second voltage divider, the other side of said first source being connected to said contacting element of said first bank and the contacting element of said second bank being connected to said one of said horizontal deflecting plates, a second source of unidirectional voltage having one side connected to a plurality of contacts of the third bank corresponding to the contacts of said first bank which are connected to said first voltage divider, the other side of said second source being connected to said contacting element of said first bank and the contacting element of said third bank being connected to said other vertical deflecting plate, and means connected to said rotatable shaft for rotation thereof.

MELVIN E. CHUN.

REFERENCES CITED

The following references are of record in the file of this patent:

UNITED STATES PATENTS

| Number | Name | Date |
|---|---|---|
| 2,171,216 | Koch | Aug. 29, 1939 |
| 2,443,794 | MacNichol, Jr. | June 22, 1948 |
| 2,448,762 | Beste | Sept. 7, 1948 |
| 2,449,093 | Weingarten | Sept. 14, 1948 |
| 2,465,355 | Cook | Mar. 29, 1949 |